United States Patent [19]

Mesnel et al.

[11] Patent Number: 5,403,632
[45] Date of Patent: Apr. 4, 1995

[54] IMPROVEMENTS TO SECTIONS MADE OF PLASTOMER OF U CROSS-SECTION, WHICH ARE INTENDED ESPECIALLY FOR FITTING TO PROJECTING EDGES OF AUTOMOBILE BODYWORK OR THE LIKE

[75] Inventors: Francois Mesnel, Neuilly-sur-Seine; Gerard Mesnel, Carrieres-sur-Seine, both of France

[73] Assignee: Etablissements Mesnel, S.A., Carrieres-sur-Seine, France

[21] Appl. No.: 925,573

[22] Filed: Aug. 4, 1992

[30] Foreign Application Priority Data

Aug. 5, 1991 [FR] France ................... 91 09950

[51] Int. Cl.⁶ .................................................. B32B 3/04
[52] U.S. Cl. .................................... 428/31; 428/122; 428/358; 428/597; 49/440; 49/475.1; 49/490.1
[58] Field of Search ............... 428/121, 122, 130, 358, 428/31, 597; 49/440, 475.1, 490.1

[56] References Cited

U.S. PATENT DOCUMENTS

| | | | |
|---|---|---|---|
| 4,259,812 | 4/1981 | Adell | 428/122 |
| 4,365,450 | 12/1982 | Adell | 428/122 |
| 4,505,965 | 3/1985 | Zipperle | 428/358 |
| 4,676,995 | 1/1987 | Fabris et al. | 525/356 |
| 4,800,681 | 1/1989 | Skillen et al. | 428/122 |
| 4,897,298 | 1/1990 | Otawa et al. | 428/122 |
| 4,943,466 | 7/1990 | Bareich | 428/31 |
| 4,969,294 | 11/1990 | Guillon et al. | 49/495 |
| 5,000,809 | 3/1991 | Adesko et al. | 428/31 |

FOREIGN PATENT DOCUMENTS

| | | | |
|---|---|---|---|
| 2283299 | 8/1974 | France | E06B 7/22 |
| 2370206 | 11/1977 | France | F16J 15/12 |
| 2520467 | 1/1983 | France | F16J 15/10 |
| 2635366 | 10/1989 | France | F16J 15/32 |
| 1550666 | 8/1979 | United Kingdom . | |
| 2181698 | 10/1985 | United Kingdom | B60B 13/04 |
| 2220969 | 7/1988 | United Kingdom | E06B 7/23 |

OTHER PUBLICATIONS

Billmeyer, Jr, Fred W., "Textbookof Polymer Chemistry", 1957, Interscience Publishers, Inc., New York, p. 285.

*Primary Examiner*—George F. Lesmes
*Assistant Examiner*—Blaine R. Copenheaver
*Attorney, Agent, or Firm*—Scully, Scott, Murphy & Preesser

[57] ABSTRACT

Improvements to sections made of plastomer of U cross-section, which are intended especially for fitting to projecting edges of automobile bodywork or the like.

6 Claims, 1 Drawing Sheet

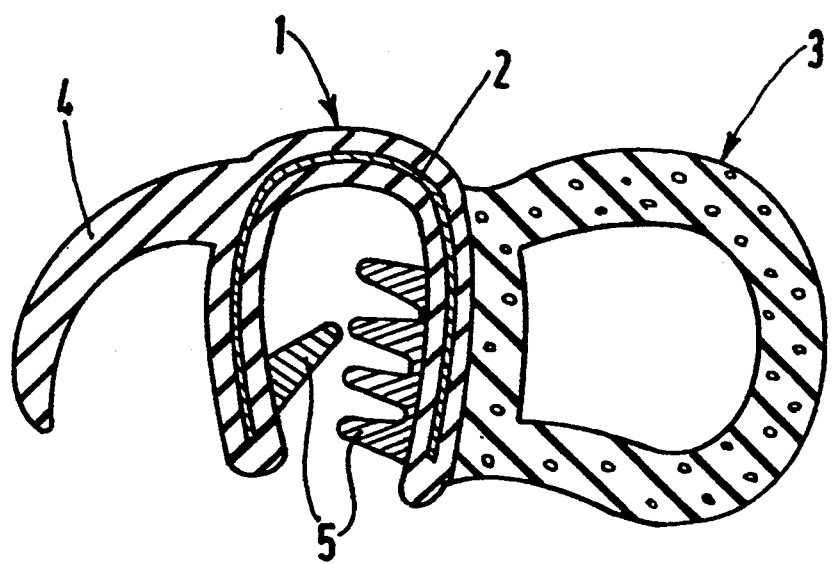

IMPROVEMENTS TO SECTIONS MADE OF PLASTOMER OF U CROSS-SECTION, WHICH ARE INTENDED ESPECIALLY FOR FITTING TO PROJECTING EDGES OF AUTOMOBILE BODYWORK OR THE LIKE

TITLE OF THE INVENTION

Improvements to sections made of plastomer of U cross-section, which are intended especially for fitting to projecting edges of automobile bodywork or the like.

BACKGROUND OF THE INVENTION

The invention relates to improvements made to sections made of plastomer of U cross-section, which are intended especially for fitting to projecting edges of automobile bodywork or the like.

Such sections generally have an internal metal reinforcement sheathed with a polymer. They are intended to cover external metal edges of bodywork, either to hide them from sight and then to act as an embellisher, or to serve as a fastener for a sealing member, for example of tubular shape, which is integrally attached thereto and intended to be distorted by compression between a door frame and the associated door. In addition, these sections generally have one or more external lips for the purpose of embellishment or sealing.

As an example, a section of this type is shown in cross-section on the single figure of the attached drawing.

Shown therein is the body 1 of the section made of elastomer of U cross-section, equipped with an internal metal reinforcement 2. On one side of the body 1 there is provided a tubular section 3, forming a bead, for example made of cellular rubber, intended to serve as a sealing member between a door and the associated door frame, whereas a lip 4 referred to as "cosmetic" projects outwards on the other side of the section and acts merely as embellishment. The body 1, the section 3 and the lip 4 can be produced in a single stage by coextrusion.

These sections of U cross-section must naturally firmly clamp the metal edge which they cover and, to this end, lips 5 usually project on the opposed inner faces of the arms of the body 1 of U cross-section. These lips 5 are inclined so as to be capable of retracting when the section is placed in position and, on the contrary, of resisting the tearing away of the latter once the section is fitted on the metal edge. These lips 5 may be identical or different and may be arranged symmetrically or otherwise in relation to the median lengthwise plane of the section. They can also be made of the same material as that of the body 1 of the section or of a different material which is coextruded with the latter.

It is rather this second solution which is usually adopted, because it is thus possible to employ for making these lips a material which is better suited to their function. There is therefore a tendency, these days, in order to produce the lips 5, to employ a relatively soft plastic which makes the section easier to place in position, and whose friction coefficient is high, in order to resist the tearing away of the section. Plastics which exhibit these properties and which are employed for this purpose are, for example, the following ones: plasticized polyvinyl chloride or blends of plasticized polyvinyl chloride with compatible polymers, especially natural rubber.

However, they exhibit the disadvantage of deforming when heated, and this constitutes a grave handicap when the vehicles fitted with such sections remain in the sun for long hours during the summer months. To avoid lessening of the clamping action of the section it is therefore necessary to resort to fitting adhesive tapes which bond it to the metal edge to which it is fitted, but this solution is naturally very costly.

The present invention is aimed at remedying these disadvantages.

SUMMARY OF THE INVENTION

One objective of the invention is therefore to propose, for the production of the lips for holding such sections of U cross-section in position, a material which, while making it easier to place the section in position on its support and while resisting its being torn away from this support, does not deform when exposed to the sun, and which has a sufficient temperature resistance at the height of summer, even in relatively hot countries.

Another objective of the invention is to propose sections of U cross-section of this type, whose retention in position on the metal edge to which they are fitted is better than in the case of the sections of the known art.

BRIEF DESCRIPTION OF THE DRAWINGS

FIGURE 1 is a sectional view of a piece of trimming.

DETAILED DESCRIPTION OF THE PREFERRED EMBODIMENTS

For this purpose, the subject of the invention is a section of U cross-section, comprising a metal reinforcement at least partially sheathed with a plastomer of the type of plasticized polyvinyl chloride and intended to cover a projecting edge, especially of automobile bodywork, one of the internal faces of the U having at least one lip directed towards the projecting edge, this section being characterized in that this lip is made of a thermoplastic elastomer compatible with that sheathing the reinforcement and provides a bonding by fusion with the latter during their coextrusion, with a net softening point of between 150° and 200° C. and a Shore hardness, at 22° C., of between 75 and 80.

A net softening point is intended to mean a softening point where the polymer loses its elastic viscosity to become purely thermoplastic when the temperature varies by not more than 10° C.

The elastomer will preferably exhibit high elastic characteristics, superior to those of the elastomers usually employed for this application. Thus, its modulus at 100% elongation will be advantageously at least 3 newton/mm$^2$ and its impact resilience (DIN standard 53512) will be higher than or equal to 45%.

Because of the net softening point of the elastomer of which the lip or lips of the section consist, these will retain all their elasticity, without residual deformation, throughout the range of temperatures to which the sections fitted to automobile bodywork are usually subjected.

Furthermore, because of their high hardness, which is markedly superior to that of the materials usually employed for this purpose, which is of the order of 60 to 65 Shore, combined with a deformation modulus which is also high, the lip or lips of the section, under tensile stress, will tend to cling to the metal edge fitted with this section and to oppose attempts to turn over allowing them to be torn away.

An excellent retention of the lips by the metal will not only be observed at ambient temperature, but also after chamber aging tests on the section, tests which are specific to automobile manufacturers, during which the section is subjected for one hour to a temperature of 90° C. In fact, because of its softening point which is higher than in the case of the elastomers usually employed, the elastomer used in accordance with the invention is less plastic at this temperature of 80° C. and will therefore exhibit elasticity and hardness properties which are close to those at ambient temperature.

To make use of the invention it will be possible to employ any elastomers which exhibit the hardness, thermoplasticity and, preferably, elasticity characteristics referred to above.

By way of example, the following will be mentioned:
- on the one hand, the compounds of the polyamides class, such as amide block polyethers, especially those marketed under the name "Pebax" (registered mark) by Atochem.
- on the other hand, the extrudable thermoplastic polyurethanes of the polyether or polyester type, especially those marketed under the name Meliopure A 78 (registered mark) by Sandoz.

This list obviously does not imply any limitation whatever.

The invention thus provides a simple and easily implemented means for improving the placing in position, the maintaining in position and the temperature resistance of the sections of U cross-section, made of reinforced elastomer intended to be fitted to projecting edges, especially of bodywork.

It will be noted in this connection that, in order to remedy the disadvantages of the sections of the prior art, the Applicant Company is acting contrary to what this known art was teaching, since, whereas a material which is as soft as possible had always been employed for producing the lips of these sections, the Applicant Company proposes to employ a material of markedly higher hardness, preferably combined with a deformation modulus which is also higher.

The elastomers employed within the scope of the present invention will preferably have, after extrusion, an external surface which is as smooth as possible in order to increase the properties of adhesiveness of the lips to the projecting edge covered by the section and thus to obtain a real locking action of the lips onto this edge.

We claim:

1. A trimming having a U-shaped cross-section, said trimming comprising a metal reinforcement at least partially sheathed with a plastomer of plasticized polyvinyl chloride, said trimming intended to cover a projecting edge, wherein said trimming includes at least one internal face, said at least one internal face having at least one lip consisting of a thermoplastic elastomer, said at least one lip being directed towards the projecting edge,
wherein said thermoplastic elastomer is compatible with said plastomer to provide bonding by fusion during coextrusion,
said trimming being characterized in that said thermoplastic elastomer has a net softening point of between 150° C. and 200° C., a Shore hardness, at 22° C., of between 75 and 80, a modulus at 100% elongation of at least 3 newton/mm$^2$ and an impact resilience, in accordance with DIN standard 53512, of at least 45%.

2. The trimming according to claim 1, wherein the thermoplastic elastomer is a polyamide.

3. The trimming according to claim 1, wherein the thermoplastic elastomer is an extrudable thermoplastic polyurethane.

4. The trimming according to claim 1, wherein said lip has a smooth outer surface.

5. The trimming according to claim 2, wherein said polyamide is an amide block polyether.

6. The trimming according to claim 3, wherein said extrudable thermoplastic polyurethane is a polyether or polyester.

* * * * *